(12) United States Patent
Lin

(10) Patent No.: US 11,892,927 B2
(45) Date of Patent: Feb. 6, 2024

(54) METHOD FOR ERROR HANDLING OF AN INTERCONNECTION PROTOCOL, CONTROLLER AND STORAGE DEVICE

(71) Applicant: SK hynix Inc., Icheon-si (KR)

(72) Inventor: Fu Hsiung Lin, Zhubei (TW)

(73) Assignee: SK hynix Inc., Icheon-si (KR)

( * ) Notice: Subject to any disclaimer, the term of this patent is extended or adjusted under 35 U.S.C. 154(b) by 24 days.

(21) Appl. No.: 17/562,729

(22) Filed: Dec. 27, 2021

(65) Prior Publication Data
US 2023/0056001 A1    Feb. 23, 2023

(30) Foreign Application Priority Data
Aug. 19, 2021    (TW) .................................. 110130594

(51) Int. Cl.
| | |
|---|---|
| G06F 11/00 | (2006.01) |
| G06F 11/30 | (2006.01) |
| G06F 13/38 | (2006.01) |
| G06F 11/07 | (2006.01) |
| H04L 1/00 | (2006.01) |

(52) U.S. Cl.
CPC ...... *G06F 11/3041* (2013.01); *G06F 11/0757* (2013.01); *G06F 11/0772* (2013.01); *G06F 11/3034* (2013.01); *G06F 13/382* (2013.01); *H04L 1/0083* (2013.01)

(58) Field of Classification Search
CPC ............. G06F 11/3041; G06F 11/0757; G06F 11/0772; G06F 11/3034; G06F 13/382; H04L 1/0083

USPC .......................................... 714/776, 748–750
See application file for complete search history.

(56) References Cited

U.S. PATENT DOCUMENTS

| | | | |
|---|---|---|---|
| 8,179,833 B2 * | 5/2012 | Attar ..................... | H04W 28/18 370/331 |
| 10,528,410 B2 | 1/2020 | Hamo | |
| 10,572,427 B2 | 2/2020 | Rosensprung et al. | |
| 2005/0028066 A1 * | 2/2005 | Raahemi ............... | H04L 1/0057 714/758 |
| 2006/0159061 A1 * | 7/2006 | Takano ................. | H04W 76/27 370/347 |
| 2011/0041025 A1 * | 2/2011 | Van Den Hamer ... | H04L 1/0061 714/E11.113 |

(Continued)

*Primary Examiner* — Albert Decady
*Assistant Examiner* — Osman M Alshack
(74) *Attorney, Agent, or Firm* — William Park & Associates Ltd.

(57) ABSTRACT

A method for error handling of an interconnection protocol, a controller, and a storage device are provided. The method includes receiving a frame error position indication signal to indicate whether an error occurs in a frame in each clock cycle and a symbol position corresponding to the error, and receiving a frame correction position indication signal to indicate whether the frame in each clock cycle is correct and a symbol position corresponding to the frame that is correct; according to the frame error position indication signal and the frame correction position indication signal, determining that a frame error occurs in a first clock cycle, and after requesting for NAC frame transmission, sending a request for disabling the NAC frame transmission; and after the first clock cycle, comparing the frame error position indication signal and the frame correction position indication signal.

8 Claims, 12 Drawing Sheets

(56) References Cited

U.S. PATENT DOCUMENTS

| | | | | |
|---|---|---|---|---|
| 2011/0161777 A1* | 6/2011 | Radulescu | .......... | H03M 13/091 |
| | | | | 714/E11.03 |
| 2013/0061099 A1* | 3/2013 | Radulescu | ............ | H04L 1/1858 |
| | | | | 714/708 |
| 2013/0262892 A1* | 10/2013 | Radulescu | ............. | H04L 7/042 |
| | | | | 713/320 |
| 2014/0143588 A1* | 5/2014 | Leinonen | ............ | G06F 11/0742 |
| | | | | 714/2 |
| 2015/0067437 A1* | 3/2015 | Bains | ................. | G06F 11/1048 |
| | | | | 714/758 |
| 2015/0160880 A1* | 6/2015 | Jang | ..................... | G06F 3/0659 |
| | | | | 711/115 |
| 2016/0170824 A1* | 6/2016 | Hamo | .................. | H04L 1/1671 |
| | | | | 714/763 |
| 2016/0224440 A1* | 8/2016 | Park | .................... | G11C 16/3454 |
| 2016/0343447 A1* | 11/2016 | Kim | ......................... | G05F 3/02 |
| 2017/0264519 A1* | 9/2017 | Kanou | ................. | H04L 5/0055 |
| 2020/0341825 A1* | 10/2020 | Sudarmani | .......... | G06F 13/1621 |

\* cited by examiner

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | ESC_DL | | | | | | | | SOF | | | TC | | reserve | | |
| 0 | L2 payload | | | | | | | | | | | | | | | |
| 0 | L2 payload | | | | | | | | | | | | | | | |
| 0 | L2 payload | | | | | | | | | | | | | | | |
| 1 | ESC_DL | | | | | | | | EOF_EVEN | frame sequence number | | | | | | |
| 0 | CRC_16 | | | | | | | | | | | | | | | |

FIG.4

METHOD FOR ERROR HANDLING OF AN INTERCONNECTION PROTOCOL, CONTROLLER AND STORAGE DEVICE

CROSS-REFERENCE TO RELATED APPLICATION

The present application claims priority under 35 U.S.C. § 119(a) to Taiwanese Patent Application No. 110130594 filed on Aug. 19, 2021, in the Taiwan Intellectual Property Office, which is incorporated herein by reference in its entirety.

BACKGROUND OF THE INVENTION

1. Field of the Invention

The present disclosure relates to an electronic device, and in particular to a method for error handling of an interconnection protocol, a controller, and a storage device.

2. Description of the Related Art

The amount of data generated and processed in mobile devices (for example, computing devices such as smartphones, tablets, multimedia devices, wearable devices, etc.) continues to increase. The chip-to-chip interconnection interface technology within the mobile device or the interconnection interface technology affected by the mobile device needs to be improved so as to meet the goals of higher transmission speed, low-power operation, scalability, support for multiplexing, and ease of use.

To this end, the Mobile Industry Processor Interface (MIPI) Alliance has developed interconnection interface technologies which can meet the above goals, such as the MIPI M-PHY specification on the physical layer and the MIPI UniPro specification on the Unified Protocol (UniPro). On the other hand, the Joint Electron Device Engineering Council (JEDEC) used the MIPI M-PHY specification and the MIPI UniPro specification to launch a next-generation high-performance non-volatile memory standard called Universal Flash Storage (UFS), which can achieve high-speed transmission and low-power operation at the level of one billion bits per second, and has the functions and scalability required by high-end mobile systems, thereby facilitating the industry to rapidly adopt it.

When the products developed by the technicians based on these interconnection interface technologies are chips, electronic modules, or electronic devices, the functions and operations of the products should meet the specifications. For example, a system implemented according to the UFS standard is a storage device including a computing device and a non-volatile memory. The computing device and the storage device play the roles of a local host and a remote device, respectively. The host and the remote device establish a bidirectional link, and the link between the host and the remote device can be configured to have multiple (up to 4) lanes in any transmission direction. The host and the remote device are respectively configured to have processing circuits based on the interconnection protocol of the UniPro specification and need to have the function of processing multiple lanes.

According to the UniPro specification, it is necessary to implement error handling in the data link layer (DL layer). When any one (which is also called as a target) of the host and the remote device detects an error in the received data, the one (the target) which detects the error should actively send a notification signal to the other one (which is also called as an initiator) that there is the error, such as a "Negative Acknowledgment Control" (NAC) frame, and thus trigger the other one (the initiator) to transmit data.

BRIEF SUMMARY OF THE INVENTION

The present disclosure provides a technology for error handling of an interconnection protocol, for use in a first device that is linkable to a second device according to the interconnection protocol. In processing of frames from the second device received by the first device with multiple frames being allowed to be received in each clock cycle, this technology can correctly and efficiently realize the transmission of the notification signal indicating the occurrence of an error in error handling in the interconnection protocol.

Various embodiments are provided below based on the information configuration technology, such as a method for error handling for an interconnection protocol, a controller and a storage device.

A method for error handling of an interconnection protocol is provided and used in a first device that is linkable to a second device according to the interconnection protocol. The method includes in processing of frames from the second device received by the first device with multiple frames being allowed to be received in each clock cycle, a) receiving a frame error position indication signal to indicate whether an error occurs in a frame in each clock cycle and a symbol position corresponding to the error, and receiving a frame correction position indication signal to indicate whether the frame in each clock cycle is correct and a symbol position corresponding to the frame that is correct; b) according to the frame error position indication signal and the frame correction position indication signal, and in a state of allowing Negative Acknowledgment Control (NAC) frame transmission, determining that a frame error occurs in a first clock cycle, and after requesting for NAC frame transmission, sending a request to enter into a state of disabling the NAC frame transmission; and c) after the first clock cycle, comparing the frame error position indication signal and the frame correction position indication signal to determine whether a request for NAC frame transmission is to be pended in response to frame error situation accordingly.

The present disclosure provides a controller for use in a first device that is linkable to a second device according to an interconnection protocol. The controller includes an interface circuit and a controller module. The interface circuit is configured to implement a physical layer of the interconnection protocol so as to link to the second device. The controller module is configured to be coupled to the interface circuit and to implement a link layer of the interconnection protocol. In processing of frames from the second device received by the first device with multiple frames being allowed to be received in each clock cycle, the controller module performs a plurality of operations, the plurality of operations includes a) receiving a frame error position indication signal to indicate whether an error occurs in a frame in each clock cycle and a symbol position corresponding to the error, and receiving a frame correction position indication signal to indicate whether the frame in each clock cycle is correct and a symbol position corresponding to the frame that is correct; b) according to the frame error position indication signal and the frame correction position indication signal, and in a state of allowing Negative Acknowledgment Control (NAC) frame transmission, determining that a frame error occurs in a first clock cycle, and after requesting for NAC frame transmission, sending a request to enter into a state of disabling the NAC frame transmission; and c) after the first clock cycle, comparing the frame error position indication signal and the frame correction position indication signal to determine whether a request for NAC frame transmission is to be pended in response to frame error situation accordingly.

The present disclosure provides a storage device, operable to link to a host according to an interconnection protocol. The storage device includes a storage module, an interface circuit, and a device controller. The interface circuit is configured to implement a physical layer of the interconnection protocol so as to link to the host. The device controller is configured to be coupled to the interface circuit and the storage module and to implement a link layer of the interconnection protocol, wherein in processing of frames from the host received by the storage device with multiple frames being allowed to be received in each clock cycle, the device controller performs a plurality of operations. The plurality of operations includes a) receiving a frame error position indication signal to indicate whether an error occurs in a frame in each clock cycle and a symbol position corresponding to the error, and receiving a frame correction position indication signal to indicate whether the frame in each clock cycle is correct and a symbol position corresponding to the frame that is correct; b) according to the frame error position indication signal and the frame correction position indication signal, and in a state of allowing Negative Acknowledgment Control (NAC) frame transmission, determining that a frame error occurs in a first clock cycle, and after requesting for NAC frame transmission, sending a request to enter into a state of disabling the NAC frame transmission; and c) after the first clock cycle, comparing the frame error position indication signal and the frame correction position indication signal to determine whether a request for NAC frame transmission is to be pended in response to the frame error situation accordingly.

In some embodiments of the above method, controller, or storage device, the method or the operations further include generating the frame error position indication signal according to whether an error occurs in a frame in each clock cycle and a symbol position corresponding to the error, and generating the frame correction position indication signal according to whether the frame in each clock cycle is correct and a symbol position corresponding to the frame that is correct.

In some embodiments of the above method, controller, or storage device, the step c) or the operation c) includes when there is a correct frame and an error frame in a second clock cycle after the first clock cycle, if a value corresponding to the frame correction position indication signal is less than a value corresponding to the frame error position indication signal, then sending a request to enter into the state of allowing NAC frame transmission and pending the request for NAC frame transmission until the state of allowing NAC frame transmission is established.

In some embodiments of the above method, controller, or storage device, the step c) or the operation c) includes when there is a correct frame and an error frame in a second clock cycle after the first clock cycle, if a value corresponding to the frame correction position indication signal is greater than a value corresponding to the frame error position indication signal, then sending a request to enter into the state of allowing NAC frame transmission and ignoring the request for NAC frame transmission.

In some embodiments of the above method, controller, or storage device, the interconnection protocol is the Universal Flash Storage (UFS) standard.

BRIEF DESCRIPTION OF THE DRAWINGS

FIG. 4 is a schematic view showing the format of the data frame of the data link layer according to the UniPro standard.

DETAILED DESCRIPTION OF THE INVENTION

To facilitate understanding of the objectives, characteristics, and effects of this present disclosure, embodiments together with the attached drawings for the detailed description of the present disclosure are provided.

The following embodiments provide a technology of error handling of an interconnection protocol for use in a first device that is linkable to a second device according to the interconnection protocol. In processing of frames from the second device received by the first device with multiple frames being allowed to be received in each clock cycle, this technology can correctly and efficiently realize the transmission of notification signals that indicate the occurrence of errors in error handling under the interconnection protocol, such as NAC frame transmission.

Figure 1:
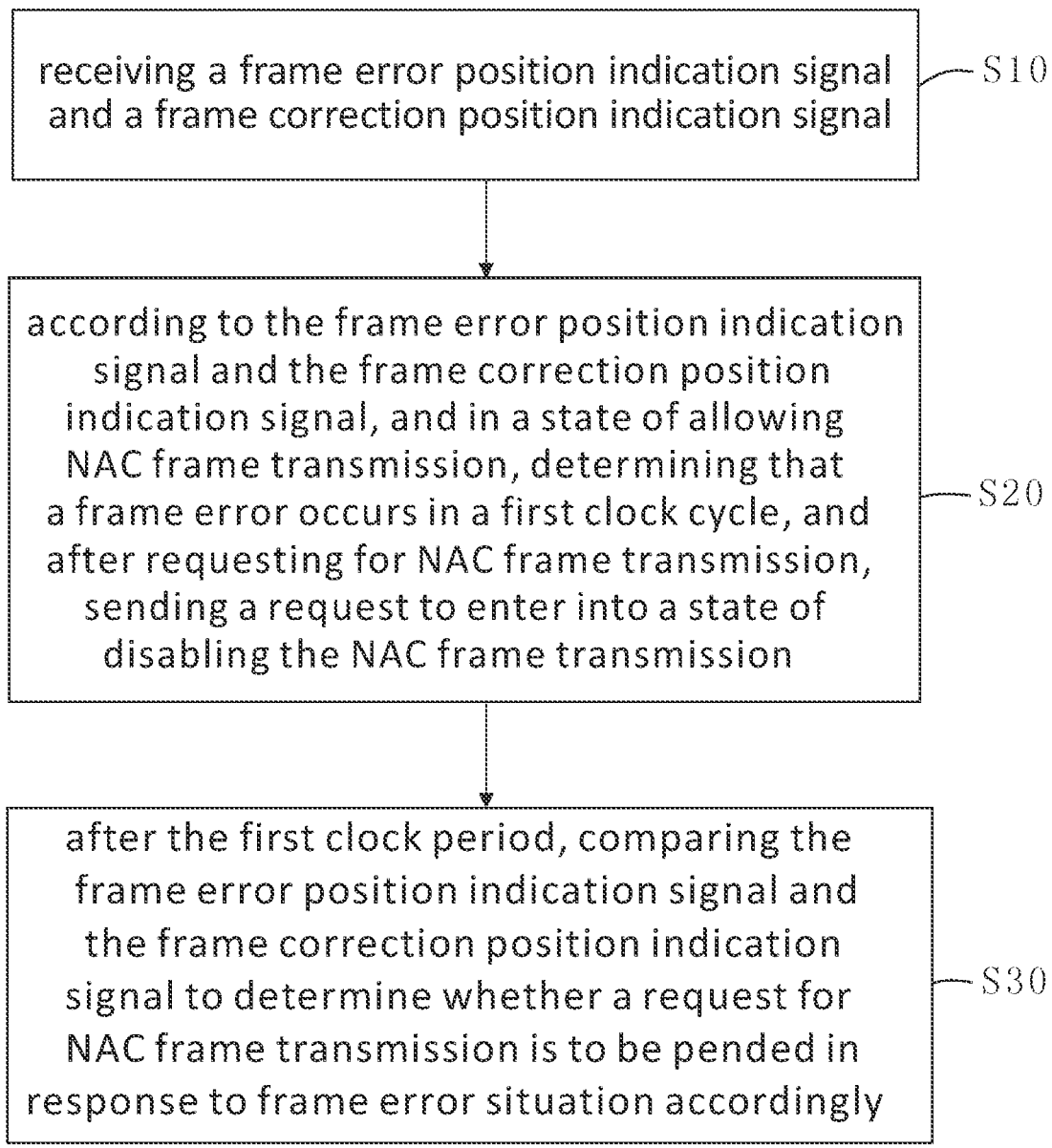
FIG. 1 is a flowchart showing a method for error handling of an interconnection protocol according to an embodiment of the present disclosure.

Please refer to FIG. 1, which is a flowchart showing a method for error handling of an interconnection protocol according to an embodiment of the present disclosure. The method can be used in a first device (for example, a storage device 20 in FIG. 2) that is linkable to a second device (for example, a host 10 in FIG. 2) according to the interconnection protocol. For ease of illustration, the first device is the storage device 20 and the second device is the host 10, for example. As shown in FIG. 1, the method includes the steps S10-S30. These steps can be performed in a hardware protocol engine (such as the hardware protocol engine 23) for implementing a link layer of the interconnection protocol in the first device (such as the storage device 20) according to the link layer of the interconnection protocol in processing of frames from the second device (for example, the host 10) received by the first device (for example, the storage device 20). In addition, this method is suitable to be used in the case that the link layer is enabled on multiple channels, wherein in the link layer, the number of symbols in the frame that needs to be processed per unit clock cycle of the data link layer may be 8 or more, or the data link layer supports processing two or more frames per unit clock cycle.

In processing of frames from the second device received by the first device with multiple frames being allowed to be received in each clock cycle:

As shown in the step S10, a frame error position indication signal is received to indicate whether an error occurs in a frame in each clock cycle and a symbol position corresponding to the error, and a frame correction position indication signal received to indicate whether the frame in each clock cycle is correct and a symbol position corresponding to the frame that is correct.

As shown in the step S20, according to the frame error position indication signal and the frame correction position indication signal, and in a state of allowing Negative Acknowledgment Control (NAC) frame transmission, it is determined that a frame error occurs in a first clock cycle, and after requesting for NAC frame transmission, a request is sent to enter into a state of disabling the NAC frame transmission.

As shown in the step S30, after the first clock cycle, the frame error position indication signal and the frame correction position indication signal are compared to determine whether a request for NAC frame transmission is to be pended in response to frame error situation accordingly.

In some embodiments of the above-mentioned method, the method further includes: generating the frame error position indication signal according to whether an error occurs in a frame in each clock cycle and a symbol position corresponding to the error, and generating the frame correction position indication signal according to whether the frame in each clock cycle is correct and a symbol position corresponding to the frame that is correct.

In some embodiments of the above-mentioned method, the step c) includes: when there is a correct frame and an error frame in a second clock cycle after the first clock cycle, if a value corresponding to the frame correction position indication signal is less than a value corresponding to the frame error position indication signal, then sending a request to enter into the state of allowing NAC frame transmission and pending the request for NAC frame transmission until the state of allowing NAC frame transmission is established.

In some embodiments of the above-mentioned method, the step c) includes: when there is a correct frame and an error frame in a second clock cycle after the first clock cycle, if a value corresponding to the frame correction position indication signal is greater than a value corresponding to the frame error position indication signal, then sending a request to enter into the state of allowing NAC frame transmission and ignoring the request for NAC frame transmission.

In some embodiments of the above method, controller, or storage device, the interconnection protocol is the Universal Flash Storage (UFS) standard.

In the above embodiment of the method in FIG. 1, although the first device is the storage device 20 and the second device is the host 10, the method is also applicable to the case that the first device is the host 10 and the second device is the storage device 20.

Various embodiments of the method according to FIG. 1 are described below.

Figure 2:
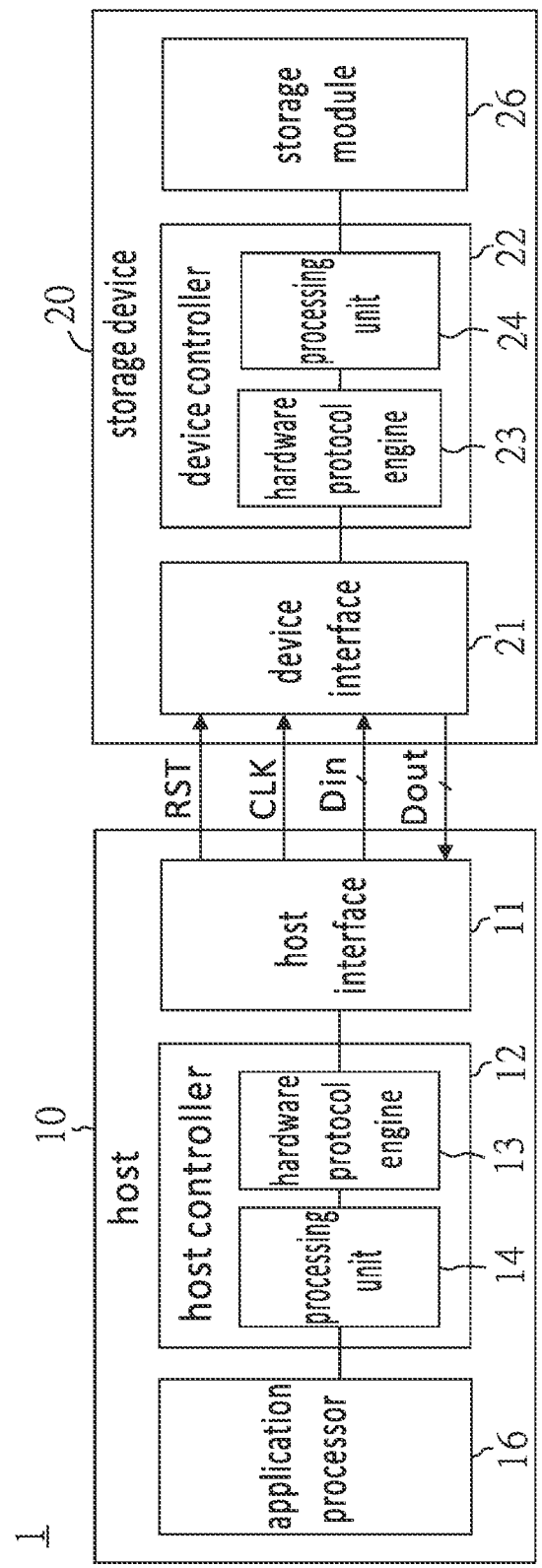
FIG. 2 is a schematic block diagram showing a storage system according to an embodiment of the present disclosure.

For ease of understanding and description, the present disclosure provides an embodiment of a circuit structure based on the above technology. This circuit structure is flexible and can be efficiently configured to meet the needs of different products, so as to adapt to the designs of various vendors and facilitate product development. As shown in FIG. 2, when this circuit structure is applied to a storage system 1, a controller (such as a host controller 12) of a host 10 of the storage system 1 or a controller module (such as a device controller 22) of a storage device 20 of the storage system 1 can be implemented as a circuit structure including a hardware protocol engine and a processing unit, respectively, wherein the processing unit of the controller is optional. For example, the combination of a host interface 11 and the host controller 12 can be used as the controller, such as a single chip, for the host 10. In addition, the combination of a device interface 21 and the device controller 22 can be used as the controller, such as a single chip, for the storage device 20.

Please refer to FIG. 2, which is a schematic block diagram showing a storage system according to an embodiment of the present disclosure. As shown in FIG. 2, the storage system 1 includes a host 10 and a storage device 20. The host 10 and the storage device 20 communicate through an interconnection protocol, so that the host 10 can access data from the storage device 20. The interconnection protocol is, for example, the Universal Flash Storage (UFS) standard. The host 10 is, for example, a computing device such as a smart phone, a tablet computer, or a multimedia device. The storage device 20 is, for example, an internal storage device inside or an external storage device outside of the computing device, such as a storage device based on a non-volatile memory. The storage device 20 can write data or provide written data to the host 10 under the control of the host 10. The storage device 20 may be implemented as a solid state storage device (SSD), a multimedia card (MMC), an embedded MMC (eMMC), a secure digital (SD) card or a universal flash storage (UFS) device, but the implementation of the present disclosure is not limited to the above examples.

The host 10 includes a host interface 11, a host controller 12, and an application processor 16.

The host interface 11 is used to implement a physical layer of the interconnection protocol to link to the storage device 20. For example, the host interface 11 is used to implement the physical (M-PHY) layer of the UFS standard.

The host controller 12 is coupled between the host interface 11 and the application processor 16. When the application processor 16 accesses data from the storage device 20, it sends a representative corresponding access action command to the host controller 12 and communicates with the storage device 20 through the interconnection protocol, so as to achieve data access to the storage device 20.

The host controller 12 includes a hardware protocol engine 13 and a processing unit 14, wherein the processing unit 14 is optional.

The hardware protocol engine 13 is used to implement a protocol layer of the interconnection protocol. For example, the interconnection protocol is the UFS standard, and the protocol layer is the Unified Protocol (UniPro) layer. The hardware protocol engine 13 communicates and converts information with the host interface 11 and the processing unit 14 in accordance with the specifications of the protocol layer.

The processing unit 14 is coupled to the hardware protocol engine 13 for communicating with the application processor 16. The processing unit 14 can execute one or more pieces of firmware. For example, the access operation command issued by the operating system, driver, or application program executed by the application processor 16 is converted into a command format conforming to the protocol layer of the interconnection protocol through the firmware executed by the processing unit 14, and then sent to the hardware protocol engine 13 for processing in accordance with the specifications of the protocol layer. For example, the firmware can be stored in the internal memory of the processing unit 14 or stored in the internal memory of the host controller 12, wherein the internal memory may include volatile memory and/or non-volatile memory.

The storage device 20 includes a device interface 21, a device controller 22, and a storage module 26.

The device interface 21 is used to implement a physical layer of the interconnection protocol to link to the host 10. For example, the host interface 21 is used to implement the physical (M-PHY) layer of the UFS standard.

The device controller 22 is coupled between the device interface 21 and the storage module 26. The device controller 22 can control the write operation, read operation, or erase operation of the storage module 26. The device controller 22 can exchange data with the storage module 26 through an address bus or a data bus. The storage module 26 includes, for example, one or more non-volatile memory chips.

The device controller 22 includes a hardware protocol engine 23 and a processing unit 24, wherein the processing unit 24 is optional.

The hardware protocol engine 23 is used to implement a link layer of the interconnection protocol. For example, the interconnection protocol is the UFS standard, and the link layer is the Unified Protocol (UniPro) layer. The hardware protocol engine 13 communicates and converts information with the device interface 21 and the processing unit 24 in accordance with the specifications of the link layer.

The processing unit 24 is coupled to the hardware protocol engine 23 for communicating with the host 10 through the device interface 21. The processing unit 24 can execute one or more pieces of firmware. For example, the processing unit 24 executes one or more pieces of firmware to control or instruct the write operation, read operation, or erase operation of the storage module 26, process the message from the hardware protocol engine 23 or send the message to the hardware protocol engine 23. For example, the firmware can be stored in the internal memory of the processing unit 24, the internal memory of the device controller 22, or a specific storage area of the storage module 26, wherein the internal memory may include volatile memory and/or non-volatile memory.

As shown in FIG. 2, the host interface 11 is coupled to the device interface 21 through data lines Din and Dout for sending/receiving data, a reset line RST for sending a hardware reset signal, and a clock line CLK for sending data. The data lines Din and Dout can be implemented as multiple pairs, and a pair of data lines Din or Dout can be called as a lane. The host interface 11 can communicate with the device interface 21 with at least one interface protocol, such as mobile industrial processor interface (MIPI), universal flash storage (UFS), small computer system interface (SCSI), or serial-connected SCSI (SAS), but the present disclosure is not limited to these examples. In the UFS standard, the host 10 and the storage device 20 can be configured to support multiple lanes therebetween to improve transmission efficiency, wherein a maximum of 2 lanes can be supported in either direction between the host 10 and the storage device 20, and the multiple lanes can be optionally set to be enabled or disabled.

In the following detailed descriptions, the interconnection protocol is the Universal Flash Storage (UFS) standard. The UFS standard includes UFS Command Set Layer (USC), UFS Transport Layer (UTP), and UFS Interconnect Layer (UIC). Further, UIC includes a link layer and a physical layer. The link layer of the UIC is defined according to the UniPro specification, and the physical layer of the UIC is defined according to the M-PHY specification.

Figure 3:
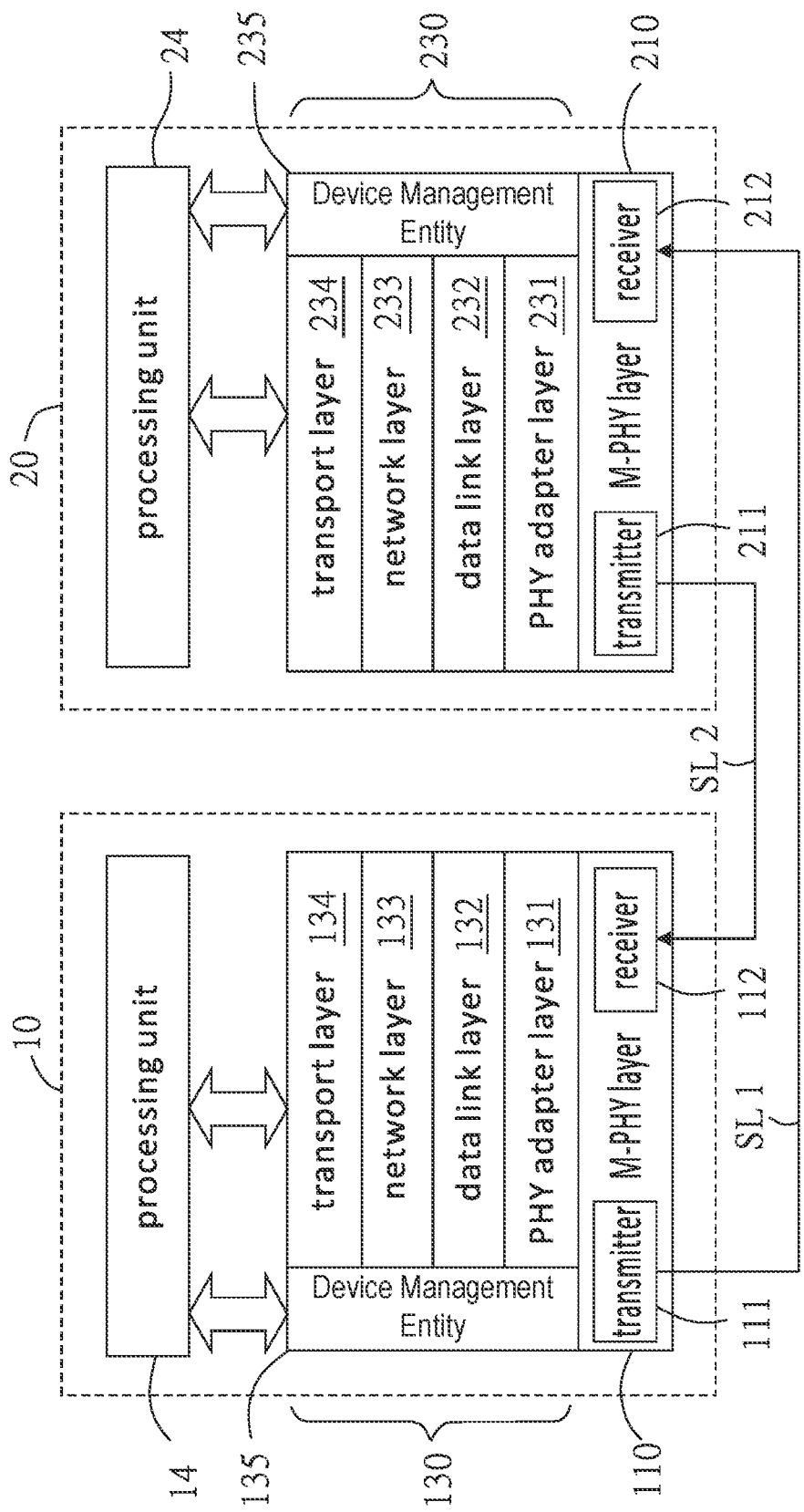
FIG. 3 is a schematic view showing the layered structure of the storage system of FIG. 2 according to the UFS standard.

Please refer to FIG. 3, which is a schematic view showing the layered structure of the storage system of FIG. 2 according to the UFS standard. Since the UFS standard is based on the MIPI Uniform Protocol (UniPro) layer and the MIPI physical (M-PHY) layer, the host interface 11 and the hardware protocol engine 13 of the host 10 shown in FIG. 2 are used to implement the M-PHY layer 110 and the UniPro layer 130 in FIG. 3, respectively, and the device interface 21 and the hardware protocol engine 23 of the storage device 20 shown in FIG. 2 are used to implement the M-PHY layer 210 and the UniPro layer 230 in FIG. 3, respectively.

As shown in FIG. 3, the UniPro layer 130 (or 230) may include a physical adapter layer (PHY adapter layer, PA) 131 (or 231), a data link layer (DL) 132 (or 232), and a network layer 133 (or 233) and transport layer 134 (or 234). The various layers in the UniPro layer 230 of the storage device 20 can be operated and implemented similarly.

The PHY adapter layer (131 or 231) is configured to couple the M-PHY layer (110 or 210) to the data link layer (132 or 232). The PHY adapter layer (131 or 231) can perform bandwidth control, power management, etc. between the M-PHY layer (110 or 210) and the data link layer (132 or 232). In implementation, the M-PHY layer 110 of the host 10 includes a transmitter 111 and a receiver 112, and the M-PHY layer 210 of the storage device 20 includes a transmitter 211 and a receiver 212, thereby establishing data channels SL1 and SL2 for full duplex communication. The UniPro specification supports multiple data lanes for the link in each transmission direction (such as forward or reverse).

The data link layer (132 or 232) is configured to perform flow control for data transmission between the host 10 and the storage device 20. That is, the data link layer (132 or 232) can monitor the data transmission or control the data transmission rate. In addition, the data link layer (132 or 232) can perform error control based on the cyclic redundancy check (CRC). The data link layer (132 or 232) can use the packets received from the network layer (133 or 233) to generate a frame, or can use the frame received from the PHY adapter layer (131 or 231) to generate packets.

The network layer (133 or 233) is configured to select the routing function of the transmission path for the packets received from the transport layer (134 or 234).

The transport layer (134 or 234) can use the commands received from the UFS application layer to configure a data segment suitable for the protocol and send the data segment to the network layer (133 or 233), or can extract commands from the packets received by the network layer (133 or 233) and send the commands to the UFS application layer. The transport layer (134 or 234) can use a sequence-based error control scheme to ensure the effectiveness of data transmission.

Further, the UniPro layer (130 or 230) defines a device management entity (DME) (135 or 235), which can interact with the various layers in the M-PHY layer (110 or 210) and the UniPro layer (130 or 230), such as the PHY adapter layer (131 or 231), the data link layer (132 or 232), the network layer (133 or 231), and the transport layer (134 or 234) so as to interact with the UFS application layer. In this way, the functions related to the integrity of the UniPro protocol are realized, such as control or configuration functions including power-on, power-off, reset, power mode change, etc.

Please refer to FIG. 4, which is a schematic view showing the format of the data frame of the data link layer according to the UniPro standard. As shown in FIG. 4, when the data carried by the payload of the data frame (which can be called the L2 payload) is 0 bytes, the data frame contains at least 4 protocol data units (for example, four 16-bit data), wherein one of the protocol data units contains the start of frame flag (SOF). In addition, the protocol data unit containing the start of frame mark (SOF) may further contain a traffic class mark, such as TC0 and TC1 to express the priority level. The ESC_DL mark represents that this frame is a frame of the data link layer, EOF_EVEN (or EOF_ODD) represents the end of frame (EOF), and CRC-16 represents a cyclic redundancy check code. Therefore, the frame shown in FIG. 4 can be regarded as containing at least a plurality of symbols (or called as a protocol data unit (PDU)). In the following drawings or descriptions, for example, SOF, Dx0, . . . , Dxy, EOF, CRC symbols are used to represent a frame containing multiple symbols, wherein x represents the frame number, and y represents the yth symbol of this frame x. For example, D00 represents the first symbol of the first frame, D01 represents the second symbol of the first frame, and so on. Certainly, there can be multiple L2 payloads, and thus the frame can contain more than 4 symbols. Therefore, the data frame has at least 4 symbols.

When multiple lanes are enabled (active), the frame signal transmission method transmits the symbol of a frame simultaneously through multiple lanes (each symbol represents 16-bit valid data). For example, in the UFS standard, from the MIPI M-PHY v4.x specification, the maximum data width from M-PHY to PA layer is 32 bits for 1 lane and 64 bits for 2 lanes.

In order to improve data throughput, in some embodiments, the M-PHY can be implemented as one lane with 64 bits and two lanes with 128 bits, which is an implementation way beyond the current limit of the M-PHY specification in the UFS standard. In some embodiments, the data width from the PA layer to the DL layer is 1 lane with 4 symbols and 2 lanes with 8 symbols.

According to the UniPro specification (such as section 6.6.10 ("UniPro v2 r.05 Specification (Section 6.6.10 NAC Frame Transmission)" on the transmission of NAC frames in the UniPro specification), it is necessary to implement error handling at the data link layer. When either of the host and the device (or the target) detects an error in the received data, the one (the target) that detects the error should actively send a notification signal to the other one (or the initiator) that the error occurred. This is called a "Negative Acknowledgment Control" (NAC) frame in UniPro, and thus triggers the other one (the initiator) to retransmit data. In addition, in the above case, after the target transmits the NAC frame, it will disable the transmission of the NAC frame until the DL layer receives a data frame or control frame (such as AFC or NAC frame) without any error (such as CRC error, error frame sequence number, etc.). In other words, unless the data link layer detects an event that can enable NAC transmission again, it will disable NAC frame transmission.

Figure 5A:
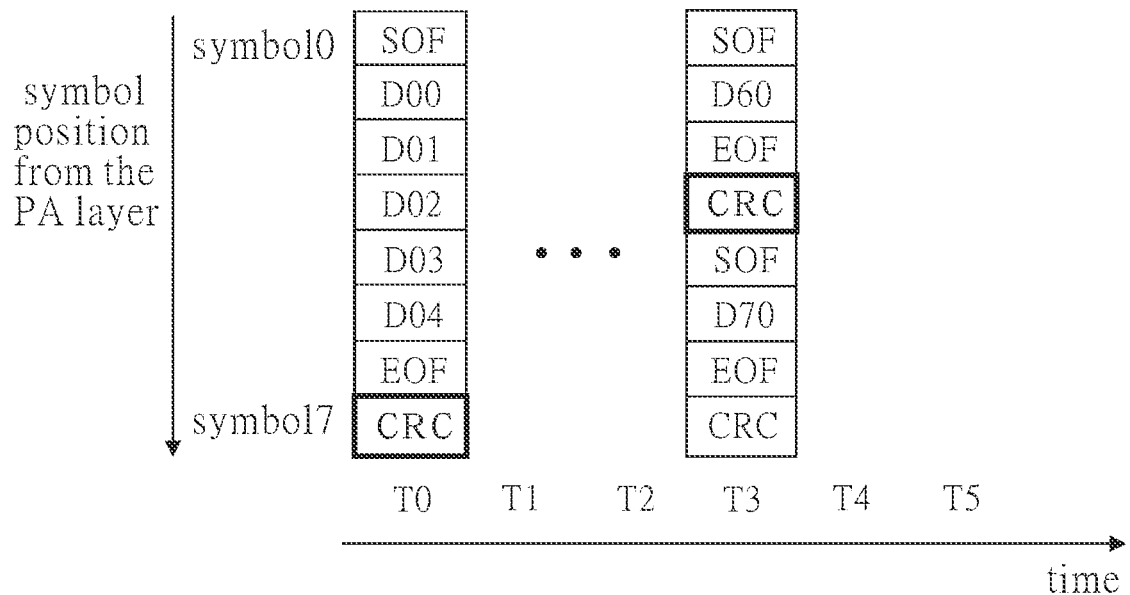
FIG. 5A is a schematic view showing whether the NAC frame transmission is enabled in the case that multiple frames are allowed to be received in each clock cycle.
Figure 5B:
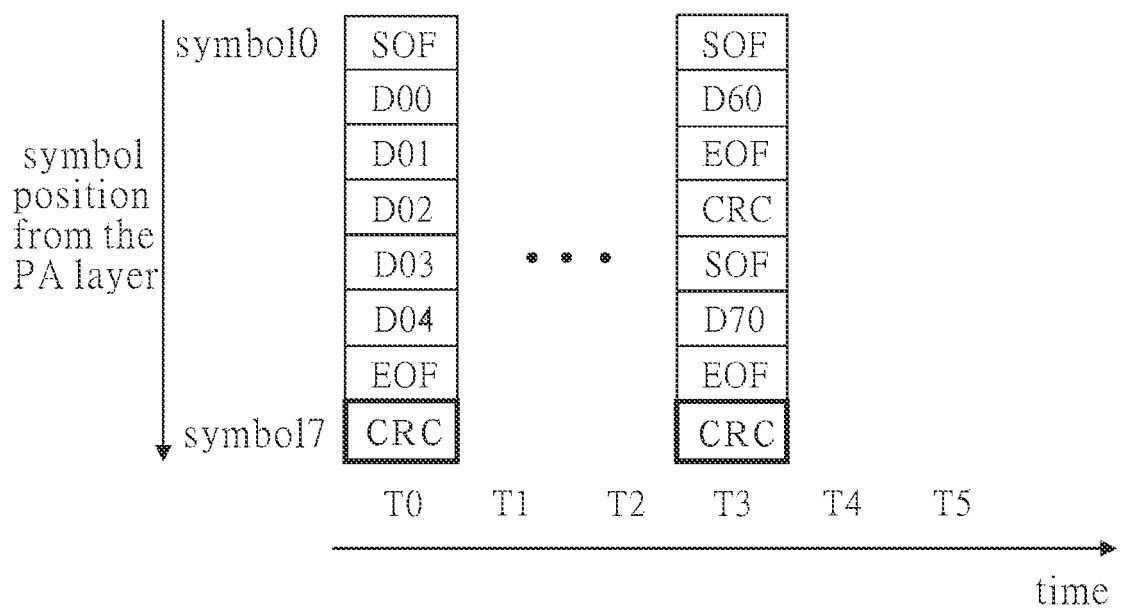
FIG. 5B is a schematic view showing the sequence problem of whether the NAC frame transmission is enabled again in the case that multiple frames are allowed to be received in each clock cycle.

Therefore, when the data width from the PA layer to the DL layer is 8 symbols or more, two or more frames are allowed to be present in each clock cycle. In any clock cycle of the receiver (RX) of the DL layer, there may be correct and error frames, which affects whether to enable the sequence of NAC frame transmission again. These issues are not mentioned in the UniPro specification adopted in the UFS standard. Please refer to FIG. 5A and FIG. 5B, which are schematic views showing whether the NAC frame transmission is enabled again in the case that multiple frames are allowed to be received in each clock cycle. In the example of FIG. 5A, FIG. 5B, or similar figures, Tm (m is an integer) on the time axis (such as T0, T1~T5) respectively represent multiple clock cycles of the clock in a clock domain. The corresponding grids above T0, T1~T5 indicate the symbol positions where the symbol received from the PA layer is temporarily stored in the corresponding clock cycle (for example, marked as symbol 0~symbol 7, respectively). In a certain clock cycle, the symbol 0 from the peer side comes earlier than the symbol 7. Within the same clock cycle, the relative meaning of other symbol positions can be obtained similarly. In addition, for ease of description, in FIG. 5A, FIG. 5B, or similar figures, if the CRC, SOF, or EOF symbol of a certain frame is wrong, it means that a frame error has occurred. The grid of the symbol in the figure (such as some CRC symbols in FIG. 5A or FIG. 5B) is represented by a thicker frame format.

As shown in FIG. 5A, after NAC transmission is disabled the error frame is present before the correct frame. In FIG. 5A, at the clock cycle T0, the CRC of the data frame containing SOF, D00-D04, EOF, and CRC symbols (hereinafter referred to as D0x data frame) is incorrect, and thus the DL layer transmits NAC. After that, NAC transmission is disabled. At the clock cycle T3, even if the CRC of the data frame containing SOF, D60, EOF, and CRC symbols (hereinafter referred to as D60 data frame; other data frames below are also expressed in a similar and concise way) is incorrect, the DL layer will not transmit the NAC. In this way, until the correct D70 data frame (the data frame includes SOF, D70, EOF, and CRC symbols and the CRC is correct) is received, the DL layer enables NAC transmission again.

FIG. 5B shows another situation that after NAC transmission is disabled, the error frame is present after the correct frame. As shown in FIG. 5B, at the clock cycle T0, the CRC of the D0x data frame is incorrect, and thus the DL layer transmits the NAC. After that, NAC transmission is disabled. At the clock cycle T3, the DL layer receives the correct D60 data frame, and then the DL layer enables NAC transmission again. Further, since the incorrect CRC of the D70 data frame indicates that the data frame is damaged, the DL layer should transmit the NAC again.

In the case of the clock cycle T3 in FIG. 5A, the DL layer does not need to transmit the NAC, but in the case of the clock cycle T3 in FIG. 5B, the DL layer needs to transmit the NAC.

In the case that multiple frames are allowed to be received in each clock cycle, in order to comply with the UniPro specification, when implementing the DL layer, it should be ensured that the NAC frame transmission request can be sent correctly due to the damaged frame, without other abnormal reasons, such as the hardware synchronization delay between the RX and TX clock domains. Otherwise, repeated transmission of the NAC or missed transmission of the NAC violates UniPro specifications, and fails to correctly reflect the true status to the UFS system. In order to solve the above-mentioned problem when multiple frames are allowed to be received in each clock cycle (as shown in FIG. 5A and FIG. 5B), the foregoing method for error handling of the interconnection protocol as shown in FIG. 1 can correctly and efficiently implement the transmission of the notification signal indicating the occurrence of an error in the error handling under the interconnection protocol, such as NAC frame transmission. The following embodiments are illustrated.

Figure 6:
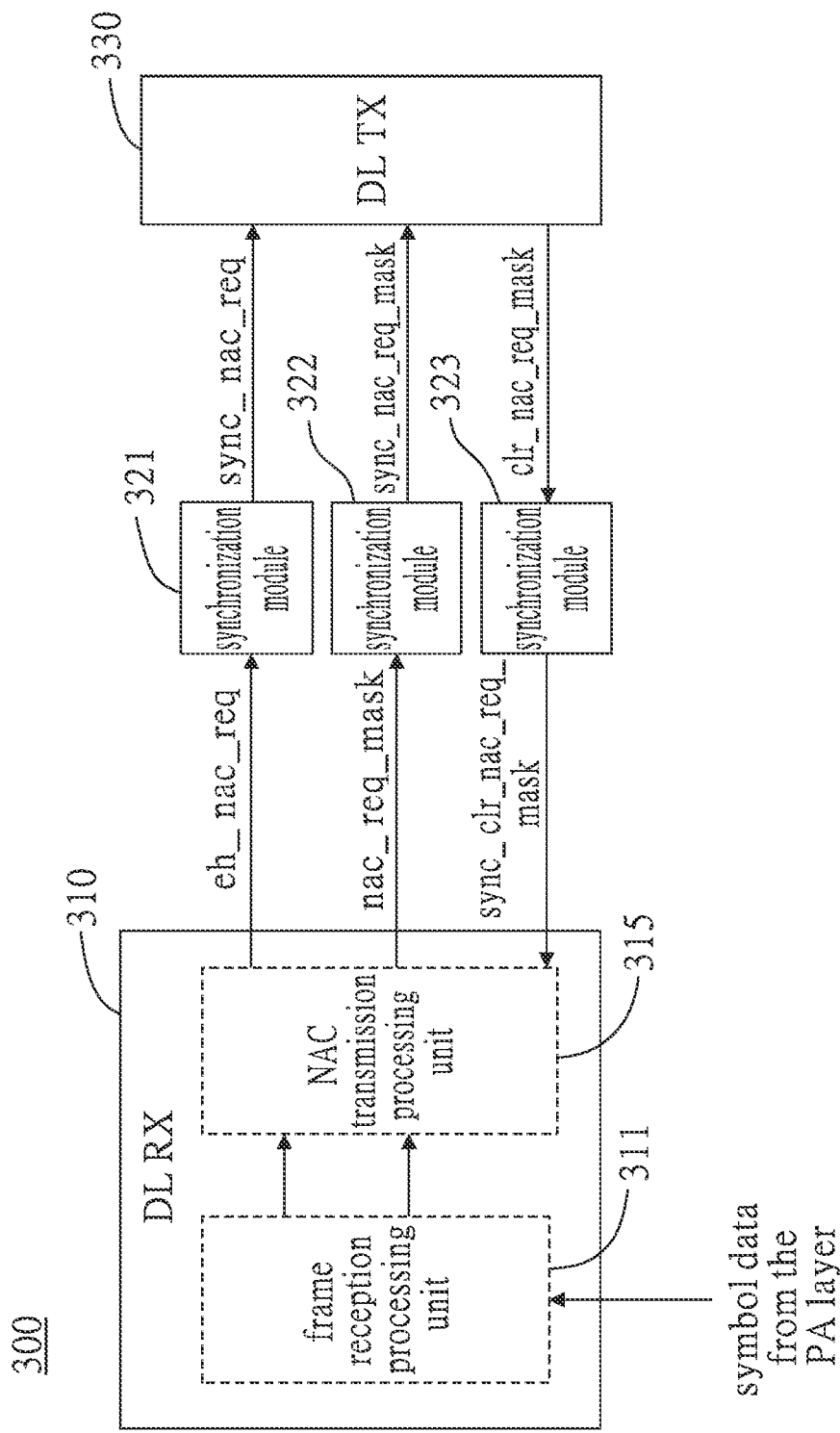
FIG. 6 is a schematic view showing a circuit structure for realizing the above-mentioned method for error handling of the interconnection protocol according to an embodiment of the present disclosure.

Please refer to FIG. 6, which is a schematic view showing a circuit structure for realizing the above-mentioned method in FIG. 1. The circuit structure shown in FIG. 6 can implement the method of FIG. 1 in the host controller 12 of the host or the device controller 22 of the storage device, such as the data link layer (132 or 232) in the hardware protocol engine of the host and the storage device.

In some embodiments, the data link layer receiver (DL RX) and the data link layer transmitter (DL TX) are implemented in the data link layer (132 or 232) according to the circuit structure of FIG. 6. As shown in FIG. 6, the data link layer circuit 300 includes a data link layer receiver (DL RX) circuit 310 and a data link layer transmitter (DL TX) circuit 330. The data link layer receiver (DL RX) circuit 310 includes a frame reception processing unit 311 and a NAC transmission processing unit 315. In addition, in one embodiment, the data link layer receiver (DL RX) circuit 310 and the data link layer transmitter (DL TX) circuit 330 are respectively implemented to operate in different clock domains, and can be coupled by the synchronization modules 321, 322, and 323 to synchronize their signals.

The frame reception processing unit 311 can implement processing on frame reception according to the UniPro specification. According to the method of FIG. 1, The frame reception processing unit 311 can be configured to have functions other than the UniPro specification. For example, the frame reception processing unit 311 is configured to generate a frame error position indication signal (for example, represented by nac_req_trig_sym[7:0]) according to whether an error occurs in the frame that appears in each clock cycle and the symbol position corresponding to the error, and according to each clock cycle, and to generate a frame correction position indication signal (for example, represented by correct_frame[7:0]) according to whether the frame in each clock cycle is correct and a symbol position corresponding to the frame that is correct. For example, in response to the implementation of M-PHY with 2 lanes and 8 symbols, the frame reception processing unit 311 correspondingly realizes that each clock cycle receives up to 8 symbol data from the PA layer, such as using a data buffer, first-in-first-out (FIFO) buffer for storage. The frame reception processing unit 311 can also use logic circuits or control circuits to implement processing on frame reception at the data link layer according to UniPro specifications. The frame reception processing unit 311 can further implement functions other than the aforementioned UniPro specification to generate the frame error position indication signal (such as nac_req_trig_sym[7:0]) and generate the frame correct position indication signal (such as correct_frame[7:0]).

The NAC transmission processing unit 315 can implement steps S10 to S30 according to the method in FIG. 1. It can further implement other embodiments according to the method of FIG. 1. The NAC transmission processing unit 315 (according to the step S10 of FIG. 1) receives the frame error position indication signal (such as nac_req_trig_sym [7:0]) and the frame correct position indication signal (such as correct_frame[7:0]). The NAC transmission processing unit 315 (according to the step S20 of FIG. 1) sends the NAC frame transmission request or a request for disabling the NAC frame transmission to the DL TX circuit 330 according to the frame error position indication signal and the frame correct position indication signal. For example, the NAC transmission processing unit 315 outputs a plurality of signals to the DL TX circuit 330, such as a signal (represented by eh_nac_req) used to make a request for NAC frame transmission and a signal (represented by nac_req_mask) used to make a request for disabling NAC frame transmission. The signals are adjusted into the sync_nac_req signal and the sync_nac_req_mask signal by the synchronization modules 321, 322. In addition, in order to make the NAC frame transmission request or the request for disabling NAC frame transmission be output correctly to the DL TX circuit 330 and comply with the UniPro specification, the NAC transmission processing unit 315 is used to represent the DL RX circuit 310 and have synchronous handshake with the DL TX circuit 330 by outputting nac_req_mask and receiving the signal (represented by clr_nac_req_mask or sync_clr_nac_req_mask) for notifying the DL RX circuit 210 of a state of the request of disabling NAC frame transmission or whether the mask is cleared. clr_nac_req_mask is output by the DL TX circuit 330 and adjusted into sync_clr_nac_req_mask by the synchronization module 323.

Figure 7:
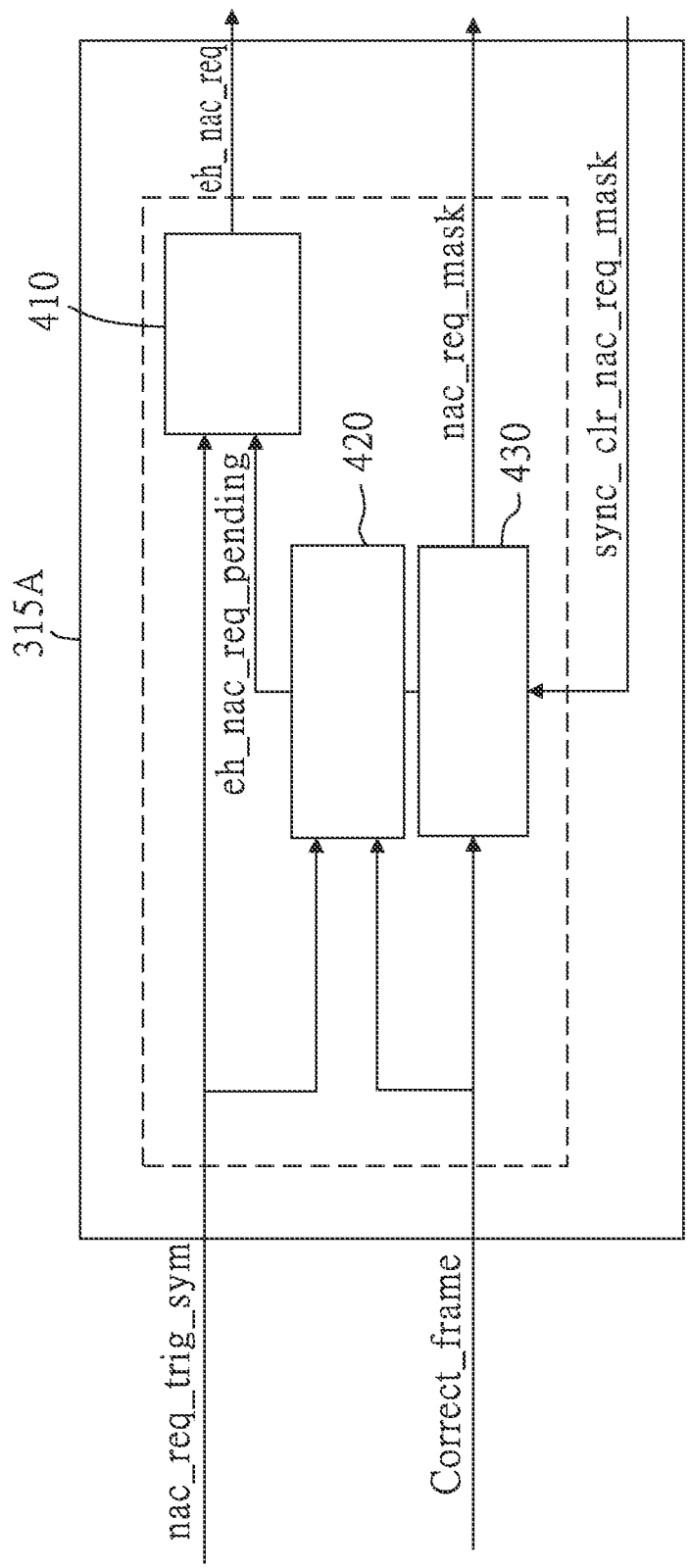
FIG. 7 is a schematic view showing the NAC transmission processing unit in the circuit structure of FIG. 6.
Figure 8:
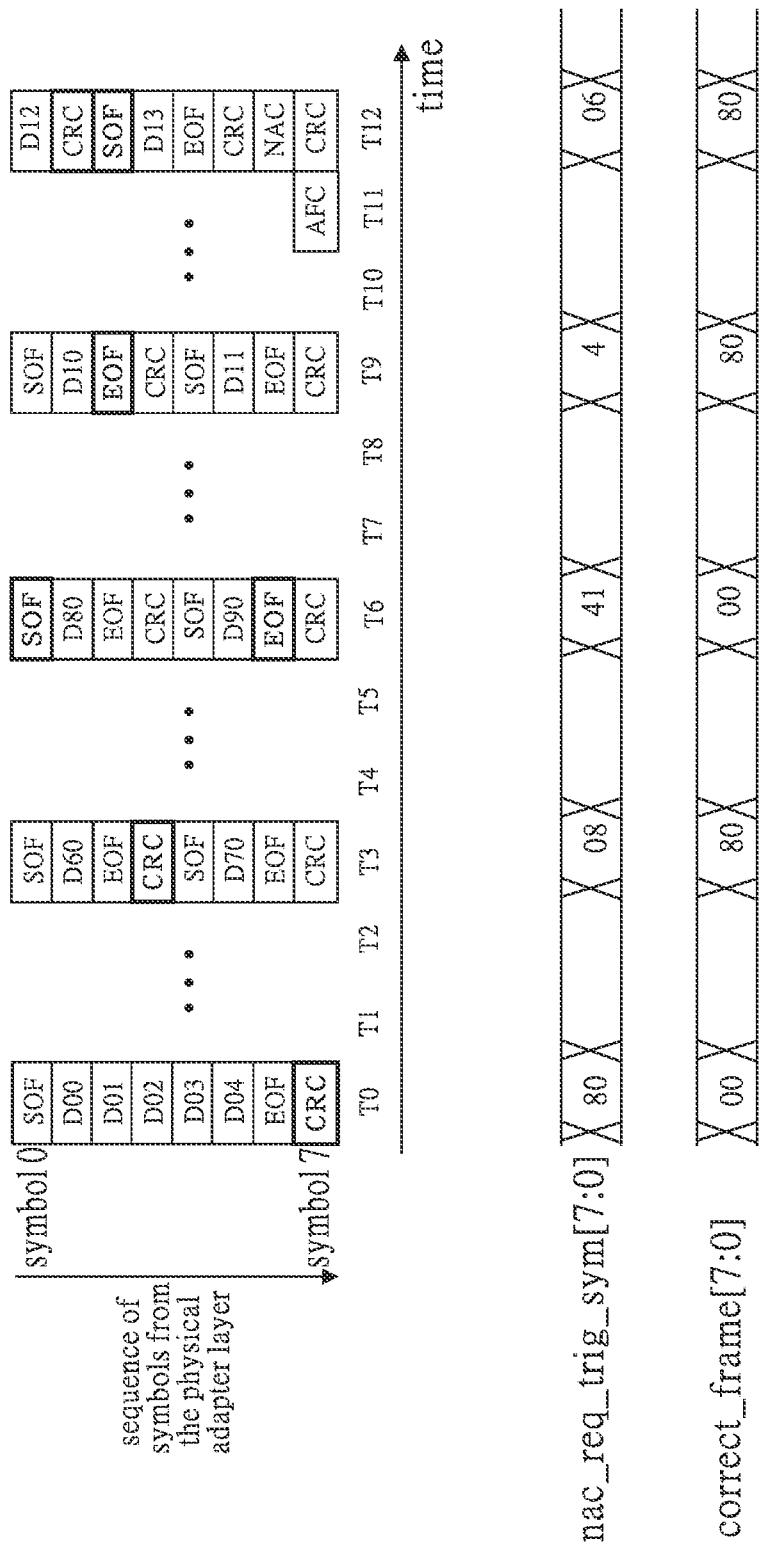
FIG. 8 is a schematic view showing the method for error handling of the interconnection protocol based on the method of FIG. 1 according to an embodiment of the present disclosure.

Please refer to FIG. 7, which is a schematic view showing an embodiment of the NAC transmission processing unit 315. As shown in FIG. 7, the NAC transmission processing unit 315A includes a logic unit 410, a comparison unit 420, and a nac_req_mask generating unit 430. As shown in FIG. 7, the NAC transmission processing unit 315A (according to the step S10 of FIG. 1) receives the frame error position indication signal (such as nac_req_trig_sym[7:0]) and the frame correct position indication signal (such as correct_frame[7:0]).

The logic unit 410 performs logic operations based on the nac_req_trig_sym[7:0] signal and the eh_nac_req_pending signal to generate the eh_nac_req signal. The logical operation is, for example, a logical operation based on a bitwise OR operation, expressed by the following formula:

eh_nac_req=(Inac_req_trig_sym)|eh_nac_req_pending wherein Inac_req_trig_sym represents the bitwise OR operation of nac_req_trig_sym[7:0].

The comparison unit 420 performs comparison according to the nac_req_trig_sym[7:0] signal and the correct_frame [7:0] signal, and determines whether the synchronous handshake between the DL RX circuit 310 and the DL TX circuit 330 is completed according to the sync_clr_nac_req_mask signal, thereby generating eh_nac_req_pending.

In the case that multiple frames are allowed to be received in each clock cycle, the comparison unit 420 can be configured with various operation modes to handle various situations. Multiple embodiments will be described later in conjunction with FIG. 8 to FIG. 12. First, the following two examples are illustrated. In the first example, the correct frame and the error frame are present in a certain clock cycle, that is, in this clock cycle, nac_req_trig_sym[7:0] has asserted bits, and correct_frame[7:0] also has asserted bits. In the first example, when the data link layer circuit 300 in a state of disabling the NAC frame transmission (i.e., nac_req_mask=1) and the synchronous handshake between the DL RX circuit 310 and the DL TX circuit 330 has not been completed (i.e., sync_clr_nac_req_mask=1), the comparison unit 420 compares the nac_req_trig_sym[7:0] signal and the correct_frame[7:0] signal (for example, by comparing the corresponding values of the two signals or the bitwise operation). In the comparison result, the nac_req_trig_sym[7:0] being greater than correct_frame[7:0] indicates that in the above-mentioned clock cycle, in terms of the receiving sequence, the error frame occurs after the correct frame. Thus, according to the UniPro specification, the DL RX circuit 310 sends a NAC frame transmission request to the DL TX circuit 330. However, since the synchronous handshaking has not yet been completed, the comparison unit 420 sets an internal signal (represented by eh_nac_req_pending_flag) as an active state (for example, 1'b1 (high level)) to pending the NAC frame transmission request. When the synchronous handshaking is completed (for example, sync_clr_nac_req_mask is changed from 1 to 0), the comparison unit 420 changes the eh_nac_req_pending_flag to the inactive state (for example, from 1'b1 to 1'b0 (low level)). At this time, the comparison unit 420 uses the falling edge of the eh_nac_req_pending_flag to generate a pulse wave of one clock cycle of the eh_nac_req_pending signal (for example, eh_nac_req_pending=1'b1). Referring to FIG. 7, the pulse wave of one clock cycle of the eh_nac_req_pending signal output by the comparison unit 420 sends a NAC frame transmission request (for example, eh_nac_req=1'b1) to the DL TX circuit 330 through the logic unit 410.

In the second example, in a certain clock cycle, only the error frame occurs, that is, in this clock cycle, only nac_req_trig_sym[7:0] has asserted bits, and the correct_frame[7:0] has the bits in the inactive state. In the second example, when the data link layer circuit 300 is in a state (i.e., nac_req_mask=0) of allowing the NAC frame transmission request to be sent (that is, nac_req_mask=0) but the synchronous handshake between the DL RX circuit 310 and the DL TX circuit 330 has not been completed (i.e., sync_clr_nac_req_mask=1), the comparison unit 420 sets the internal signal eh_nac_req_pending_flag=1'b1 for pending the NAC frame transmission request. When the synchronous handshaking is completed (for example, sync_clr_nac_req_mask is changed from 1 to 0), the comparison unit 420 sets eh_nac_req_pending_flag=1'b0. At this time, the comparison unit 420 uses the falling edge of the eh_nac_req_pending_flag to generate a pulse wave of one clock cycle of the eh_nac_req_pending signal (for example, eh_nac_req_pending=1'b1). Referring to FIG. 7, the pulse wave of one clock cycle of the eh_nac_req_pending signal output by the comparison unit 420 sends a NAC frame transmission request (for example, eh_nac_req=1'b1) to the DL TX circuit 330 through the logic unit 410.

The nac_req_mask generating unit 430 performs operations based on the correct_frame[7:0] signal and the sync_clr_nac_req_mask signal to generate a nac_req_mask signal, so as to perform a synchronous handshake between the DL RX circuit 310 and the DL TX circuit 330. For example, in a certain clock cycle, when nac_req_trig_sym[7:0] has asserted bits (an error frame), the nac_req_mask generating unit 430 sets nac_req_mask=1, and adjusts it to sync_nac_req_mask through the synchronization module 322 to the DL TX circuit 330. When the DL RX circuit 310 sends a NAC frame transmission request to the DL TX circuit 330, and the DL TX circuit 330 actually sends out the NAC frame, the DL TX circuit 330 sets clr_nac_req_mask=1'b1 and adjusts sync_clr_nac_req_mask=1'b1 through the synchronization module 323.

In order to solve the above-mentioned problem in the case that multiple frames are allowed to be received in each clock cycle (as shown in FIG. 5A and FIG. 5B), the following description according to the method of FIG. 1 illustrates how to perform "identifying the error position", "comparing" and "determining whether to pend a request for NAC frame transmission" based on the frame error position indication signal (such as nac_req_trig_sym[7:0]) and the frame correction position indication signal (such as correct_frame[7:0]).

For example, the frame error position indication signal (for example, represented by nac_req_trig_sym[n−1:0]) indicates whether an error occurs in the frame in each clock cycle and the symbol position corresponding to the error, wherein n is an integer representing the number of symbols allowed in a certain clock cycle, for example, 8 or more. In the following embodiment, n is 8, and the conditions for the occurrence of errors are defined by UniPro specifications, for example, the conditions required to transmit NAC frames referred to in section 6.6.10 of the UniPro specification for NAC frame transmission. The frame correction position indication signal (such as correct_frame[7:0]) indicates whether the frame occurring in each clock cycle is correct and the corresponding symbol position (such as correct CRC). Please refer to FIG. 8. The following examples illustrate the error frame or the correct frame at different clock cycles.

In the clock cycle T0: the D0x data frame has a CRC error. The CRC symbol is at symbol 7, so the binary value corresponding to nac_req_trig_sym[7:0] is 10000000, which is decoded as a hexadecimal value, which is 0x80. At the clock cycle T0 of FIG. 8, the waveform of nac_req_trig_sym[7:0] is indicated by the hexadecimal value "80". Since there is no correct data frame in the clock cycle T0, the binary value corresponding to correct_frame[7:0] is 00000000, and the hexadecimal value is 0x00, as shown by "00" in FIG. 8.

At the clock cycle T3: the D60 data frame has a CRC error. The CRC symbol is at symbol 3, so the binary value corresponding to nac_req_trig_sym[7:0] is 00001000, which is decoded as 0x08. On the other hand, the D70 data frame is correct. The CRC symbol of the D70 data frame is symbol 7, so the binary value corresponding to correct_frame[7:0] is 10000000, which is 0x80.

At the clock cycle T6: the D80 data frame has frame syntax error, such as SOF symbol error, and D90 data frame has EOF syntax error. The above two errors occur at symbols 0 and 6, so the binary value corresponding to nac_req_trig_sym[7:0] is 01000001, which is decoded as 0x41. Since there is no correct data frame in the clock cycle T6, the binary value corresponding to correct_frame[7:0] is 00000000, that is, 0x00.

At the clock cycle T9: the D10 data frame has an EOF error. The error occurs at symbol 2, so the binary value corresponding to nac_req_trig_sym[7:0] is 00000100, which is decoded as 0x04. On the other hand, the D11 data frame is correct. The CRC symbol of the D11 data frame is at symbol 7, so correct_frame[7:0] is 0x80.

At the clock cycle T12: The D12 data frame (which is an AFC frame containing AFC, D12, and CRC symbols) has a CRC error, and the D13 data frame has a frame syntax error. The above two errors occur at symbol 1 and symbol 2, so the binary value corresponding to nac_req_trig_sym[7:0] is 00000110, which is decoded as 0x06. On the other hand, the NAC frame (which includes NAC and CRC symbols) is correct. The CRC symbol of the D11 data frame is at symbol 7, so correct_frame[7:0] is 0x80.

The above shows the first process of identifying the error frame position and the correct frame position, i.e., identifying the error position. On the other hand, the frame receiving and processing unit 311 in FIG. 6 detects frame errors and confirms the correct frame according to the UniPro specification by using the method of FIG. 8 to, thereby generating nac_req_trig_sym and correct_frame signals.

The following examples illustrate the process of "comparing" and "determining whether a request for NAC frame transmission is to be pended".

Based on the step S20 of FIG. 1, according to the frame error position indication signal and the frame correction position indication signal, and in a state of allowing NAC frame transmission, it is determined that a frame error occurs in a first clock cycle, and after requesting for NAC frame transmission, a request is sent to enter into a state of disabling the NAC frame transmission. For example, a request signal is sent to instruct DL TX to enter this state, by changing nac_req_mask to an asserted state. Then, based on the step S30 of FIG. 1, after the first clock cycle, the frame error position indication signal and the frame correction position indication signal are compared to determine whether a request for NAC frame transmission is to be pended in response to frame error situation accordingly.

In some embodiments, during each clock cycle, the processing methods can be defined for the following types of situations.

1. When only the correct frame is received, nac_req_mask is cleared, and the NAC transmission is enabled again.

2. When only the damaged frame is received, the error condition is ignored and NAC is not sent.

3. When the correct frame and the damaged frame are received, DL RX compares correct_frame[7:0] with nac_req_trig_sym[7:0]. The comparison result may be the situation 3A or the situation 3B. In the situation 3A, if the value of the correct_frame[7:0] is less than the value of the nac_req_trig_sym[7:0], nac_req_mask is cleared, the NAC frame transmission request is pended, and after nac_req_mask is set to be de-asserted, the NAC frame transmission request is sent. In the situation 3B, if the value of the correct_frame[7:0] is greater than the value of the nac_req_trig_sym[7:0], nac_req_mask is cleared, the error condition is ignored and the NAC is not sent.

The following examples are illustrated for each situation.

Figure 9:
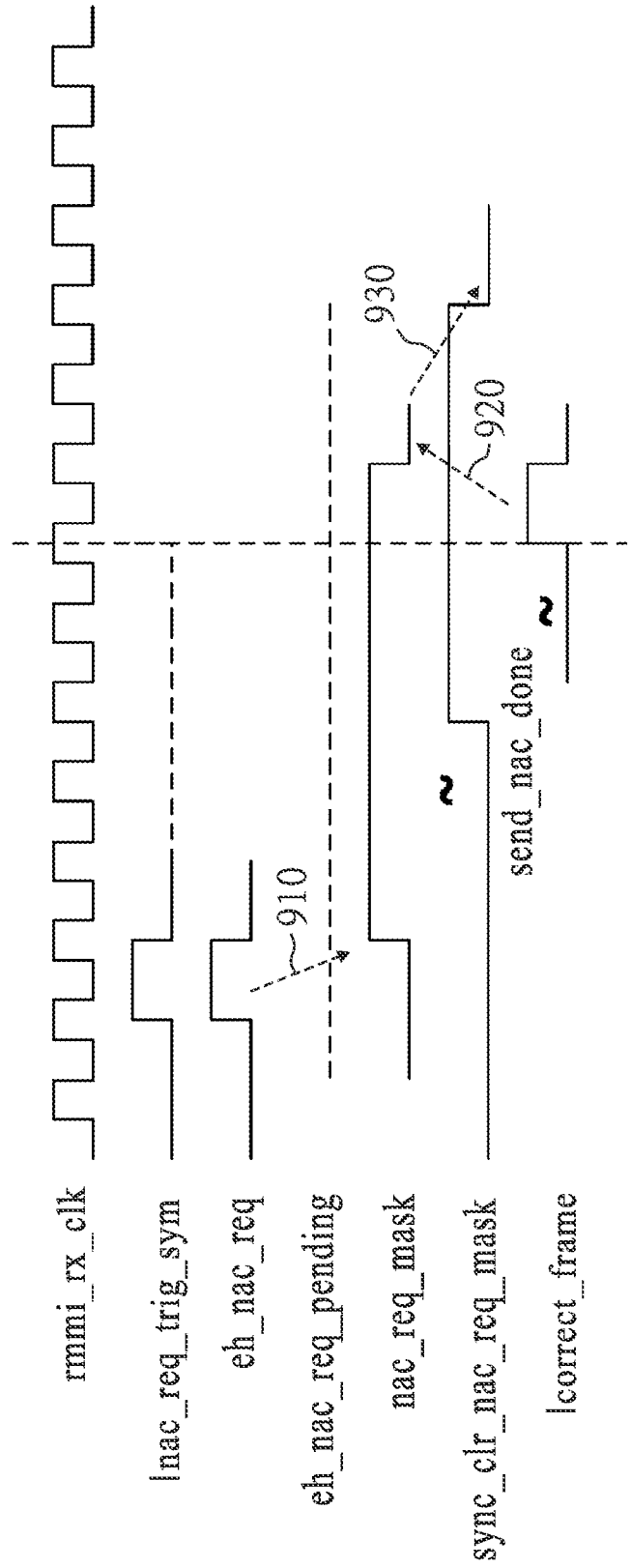
FIG. 9 is a schematic view showing the method for error handling of the interconnection protocol based on the method of FIG. 1 according to an embodiment of the present disclosure.

Please refer to FIG. 9 to FIG. 12, which show the processing of the NAC transmission in each situation in the circuit structure of FIG. 6 and FIG. 7 according to the method of FIG. 1. The signal waveform diagram is illustrated and exemplified. In FIG. 9, rmmi_rx_clk represents the clock signal of the RMMI RX clock domain. The Inac_req_trig_sym signal after bitwise or operation is used to indicate the nac_req_trig_sym[7:0] signal, and the Icorrect_frame signal after bitwise or operation is used to indicate correct_frame[7:0] signal.

Please refer to FIG. 9, which illustrates the processing method for the situation 1. Referring to FIG. 9, as indicated by the dotted arrow 910, when the first error occurs, nac_req_trig_sym[7:0] of the DL RX (such as 310 of FIG. 6) triggers the NAC frame transmission request (for example, through the eh_nac_req signal) to the DL TX (such as 330 of FIG. 6) for sending the NAC. At the same time, as indicated by the dotted arrow 910 in FIG. 9, the nac_req_mask signal is set to be asserted (such as a high level) to disable the NAC frame transmission. In addition, after sending the NAC (as indicated by send_nac_done), the sync_clr_nac_req_mask signal is set to be asserted.

As indicated by the dotted arrow 920 in FIG. 9, after receiving the correct frame (for example, the Icorrect_frame is asserted), the nac_req_mask signal is set to be de-asserted for enabling the NAC transmission through the synchronous handshake between the DL TX and the DL RX. As indicated by the dotted arrow 930 in FIG. 9, the sync_clr_nac_req_mask signal is set to be de-asserted (such as a low level).

Figure 10:
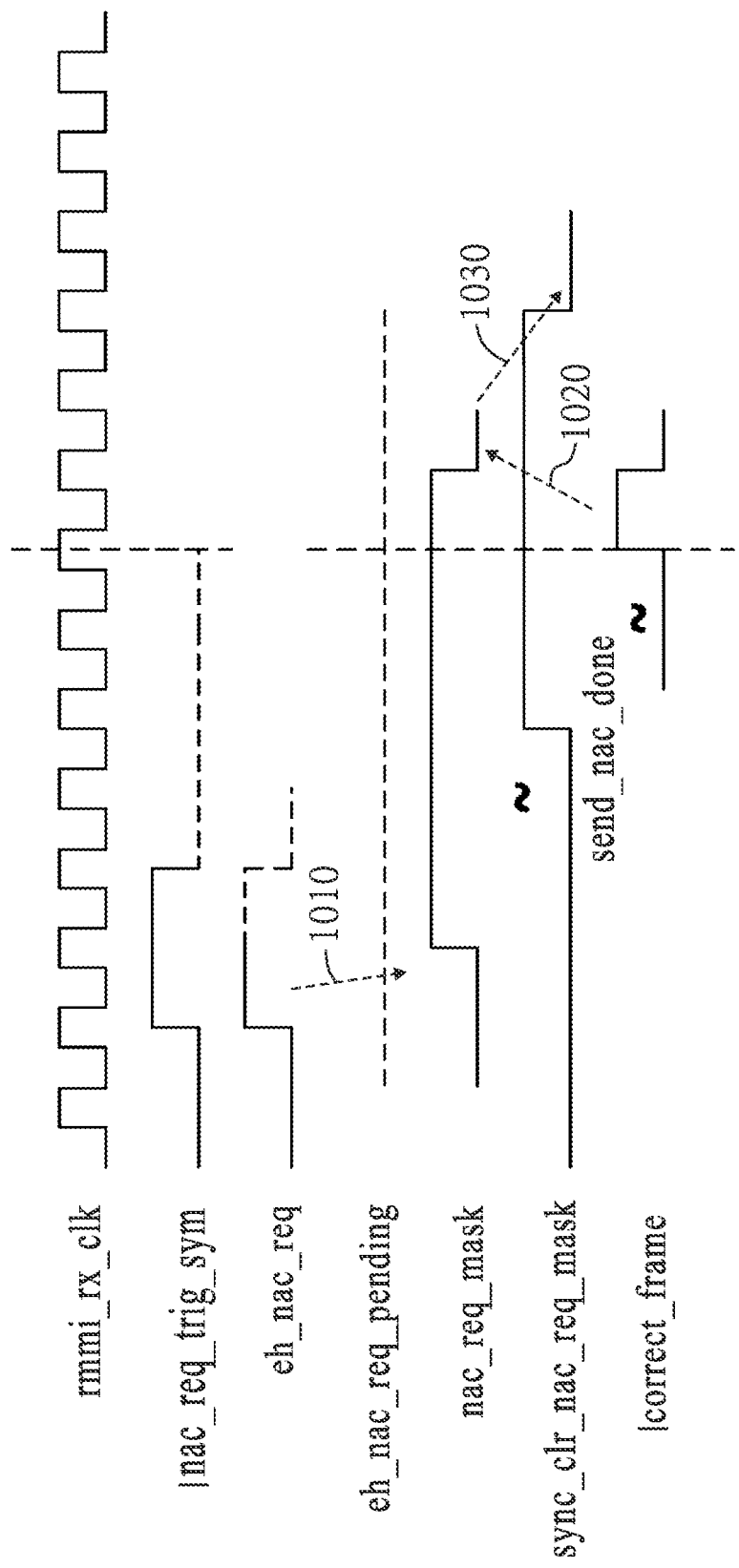
FIG. 10 is a schematic view showing the method for error handling of the interconnection protocol based on the method of FIG. 1 according to an embodiment of the present disclosure.

Please refer to FIG. 10, which illustrates the processing method for the situation 2. Referring to FIG. 10, as indicated by the dotted arrow 1010, when the first error occurs, nac_req_trig_sym[7:0] of the DL RX (such as 310 of FIG. 6) triggers the NAC frame transmission request (for example, through the eh_nac_req signal) to the DL TX (such as 330 of FIG. 6) for sending the NAC. At the same time, as indicated by the dotted arrow 1010 in FIG. 10, the nac_req_mask signal is set to be asserted (such as a high level) to disable the NAC frame transmission. In addition, after sending the NAC (as indicated by send_nac_done), the sync_clr_nac_req_mask signal is set to be asserted.

When the nac_req_mask is still asserted and the DL RX receives the damaged frame again, the damaged frame will be ignored and the NAC will not be sent.

As indicated by the dotted arrow 1020 in FIG. 10, after receiving the correct frame (the Icorrect_frame is asserted), the nac_req_mask signal is set to be de-asserted for enabling the NAC transmission through the synchronous handshake between the DL TX and the DL RX. As indicated by the dotted arrow 1030 in FIG. 10, the sync_clr_nac_req_mask signal is set to be de-asserted.

Figure 11:
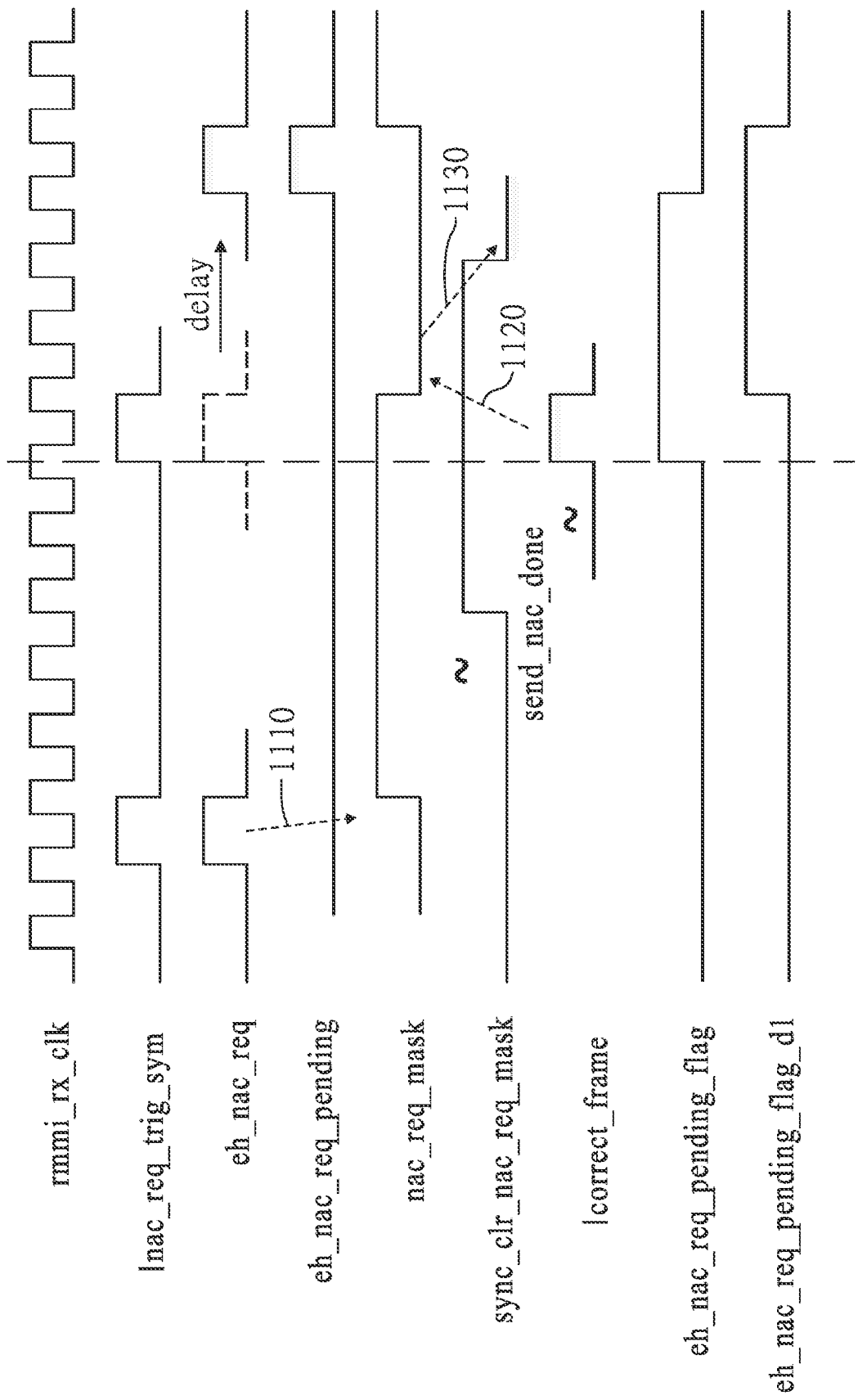
FIG. 11 is a schematic view showing the method for error handling of the interconnection protocol based on the method of FIG. 1 according to an embodiment of the present disclosure.

Please refer to FIG. 11, which illustrates the processing method for the situation 3A. Referring to FIG. 11, as indicated by the dotted arrow 1110, when the first error occurs, nac_req_trig_sym[7:0] of the DL RX (such as 310 of FIG. 6) triggers the NAC frame transmission request (for example, through the eh_nac_req signal) to the DL TX (such as 330 of FIG. 6) for sending the NAC. At the same time, as indicated by the dotted arrow 1110 in FIG. 11, the nac_req_mask signal is set to be asserted for disabling the NAC frame transmission.

After that, if the DL RX receives both the damaged frame and the correct frame at the same time, the eh_nac_req_pending signal is set to be asserted (combination of eh_nac_req_pending_flag and sync_clr_nac_req_mask) for triggering the DL TX to start sending the NAC when the damaged frame is after the correct frame.

As indicated by the dotted arrow 1120 in FIG. 11, after receiving the correct frame (the Icorrect_frame is asserted), the nac_req_mask signal is set to be de-asserted for enabling the NAC transmission through the synchronous handshake between the DL TX and the DL RX. As indicated by the dotted arrow 1130 in FIG. 11, the sync_clr_nac_req_mask signal is set to be de-asserted. In FIG. 11, for example, eh_nac_req_pending_flag_d1 is a signal delayed for one clock cycle from eh_nac_req_pending_flag, and is a signal inside the comparison unit 420. For example, in order to set the eh_nac_req_pending signal to be asserted, when eh_nac_req_pending_flag=0 and eh_nac_req_pending_flag_d1=1, the comparison unit 420 can use the falling edges of eh_nac_req_pending_flag_d1 and eh_nac_req_pending_flag to generate a pulse wave (high level) of one clock cycle of the eh_nac_req_pending signal through logic operations, as shown in FIG. 11.

Figure 12:
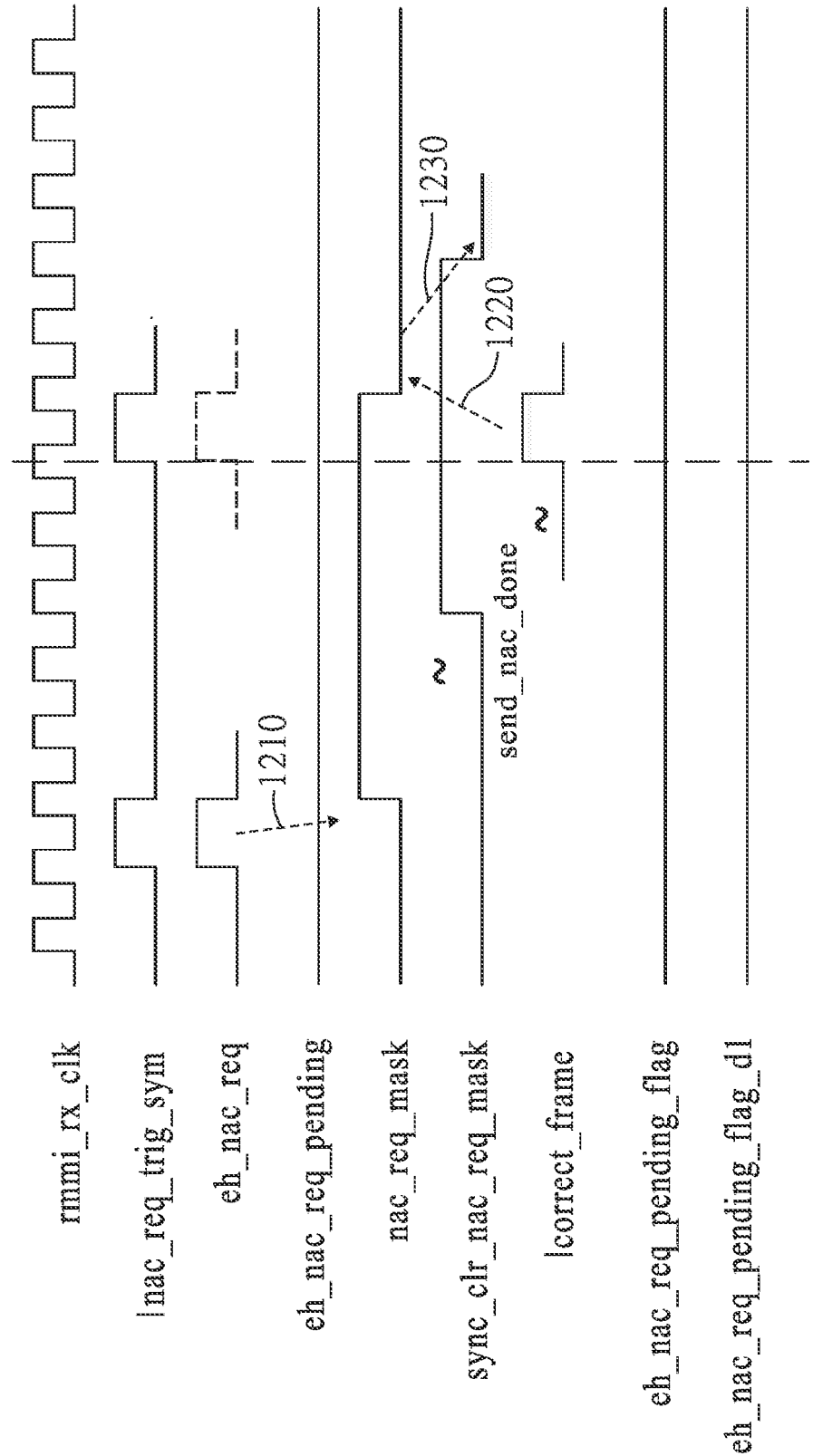
FIG. 12 is a schematic view showing the method for error handling of the interconnection protocol based on the method of FIG. 1 according to an embodiment of the present disclosure.

Please refer to FIG. 12, which illustrates the processing method for the situation 3B. Referring to FIG. 12, as indicated by the dotted arrow 1210, when the first error occurs, nac_req_trig_sym[7:0] of the DL RX (such as 310 of FIG. 6) triggers the NAC frame transmission request (for example, through the eh_nac_req signal) to the DL TX (such as 330 of FIG. 6) for sending the NAC. At the same time, as indicated by the dotted arrow 1210 in FIG. 12, the nac_req_mask signal is set to be asserted for disabling the NAC frame transmission.

After that, if the DL RX receives both the damaged frame and the correct frame at the same time, the eh_nac_req_pending signal remains de-asserted (such as a low level) when the damaged frame is before the correct frame.

As indicated by the dotted arrow 1220 in FIG. 12, after receiving the correct frame (the lcorrect_frame is asserted), the nac_req_mask signal is set to be de-asserted for enabling the NAC transmission through the synchronous handshake between the DL TX and the DL RX. As indicated by the dotted arrow 1230 in FIG. 12, the sync_clr_nac_req_mask signal is set to be de-asserted.

By performing the steps of "identifying the error position", "comparing", and "determining whether the request for NAC frame transmission is pended" according to the method in FIG. 1, DL RX can correctly request DL TX to send the NAC frame or not reflect the real status to the UFS system.

In addition, in the above embodiments related to the host and the storage device, the hardware protocol engine in the host controller or the device controller can be designed based on the technology using a hardware description language (HDL) such as Verilog language or any other design method of digital circuits familiar to those skilled in the art, and can be implemented based on one or more circuits such as a field programmable gate array (FPGA), application specific integrated circuit (ASIC), or complex programmable logic device (CPLD). It can also be realized by using dedicated circuits or modules. The host controller or device controller (or a processing unit or a hardware protocol engine therein) can also be implemented based on a microcontroller, a processor, or a digital signal processor.

While the present disclosure has been described by means of specific embodiments, numerous modifications and variations could be made thereto by those skilled in the art without departing from the scope and spirit of the present disclosure set forth in the claims.

What is claimed is:

1. A method for error handling of an interconnection protocol, for use in a first device that is linkable to a second device according to the interconnection protocol, the method comprising:
   in processing of frames from the second device received by the first device with multiple frames being allowed to be received in each clock cycle:
   a) receiving a frame error position indication signal to indicate whether an error occurs in a frame in each clock cycle and a symbol position corresponding to the error, and receiving a frame correction position indication signal to indicate whether the frame in each clock cycle is correct and a symbol position corresponding to the frame that is correct;
   b) according to the frame error position indication signal and the frame correction position indication signal, and in a state of allowing Negative Acknowledgment Control (NAC) frame transmission, determining that a frame error occurs in a first clock cycle, and after requesting for NAC frame transmission, sending a request to enter into a state of disabling the NAC frame transmission; and
   c) after the first clock cycle, comparing the frame error position indication signal and the frame correction position indication signal, wherein
   when there is a correct frame and an error frame in a second clock cycle after the first clock cycle, if a value corresponding to the frame correction position indication signal is less than a value corresponding to the frame error position indication signal, then sending a request to enter into the state of allowing NAC frame transmission and the request for NAC frame transmission until the state of allowing NAC frame transmission is established.

2. The method according to claim 1, wherein the method further includes:
   generating the frame error position indication signal according to whether an error occurs in a frame in each clock cycle and a symbol position corresponding to the error, and generating the frame correction position indication signal according to whether the frame in each clock cycle is correct and a symbol position corresponding to the frame that is correct.

3. The method according to claim 1, wherein the step c) includes:
   when there is a correct frame and an error frame in a second clock cycle after the first clock cycle, if a value corresponding to the frame correction position indication signal is greater than a value corresponding to the frame error position indication signal, then sending a request to enter into the state of allowing NAC frame transmission and ignoring the request for NAC frame transmission.

4. The method according to claim 1, wherein the interconnection protocol is Universal Flash Storage (UFS) standard.

5. A controller for use in a first device that is linkable to a second device according to an interconnection protocol, the controller comprising:
   an interface circuit, configured to implement a physical layer of the interconnection protocol so as to link to the second device; and
   a controller module, configured to be coupled to the interface circuit and to implement a link layer of the interconnection protocol, wherein in processing of frames from the second device received by the first device with multiple frames being allowed to be received in each clock cycle, the controller module performs a plurality of operations, the plurality of operations including:
   a) receiving a frame error position indication signal to indicate whether an error occurs in a frame in each clock cycle and a symbol position corresponding to the error, and receiving a frame correction position indication signal to indicate whether the frame in each clock cycle is correct and a symbol position corresponding to the frame that is correct;
   b) according to the frame error position indication signal and the frame correction position indication signal, and in a state of allowing Negative Acknowledgment Control (NAC) frame transmission, determining that a frame error occurs in a first clock cycle, and after requesting for NAC frame transmission, sending a request to enter into a state of disabling the NAC frame transmission; and
   c) after the first clock cycle, comparing the frame error position indication signal and the frame correction position indication signal, and wherein, when there is a correct frame and an error frame in a second clock cycle after the first clock cycle, if a value corresponding to the frame correction position indication signal is less than a value corresponding to the frame error position indication signal, then sending a request to enter into the state of allowing NAC frame transmission and the request for NAC frame transmission until the state of allowing NAC frame transmission is established.

6. The controller according to claim 5, wherein the plurality of operations that the controller module performs further includes:
generating the frame error position indication signal according to whether an error occurs in a frame in each clock cycle and a symbol position corresponding to the error, and generating the frame correction position indication signal according to whether the frame in each clock cycle is correct and a symbol position corresponding to the frame that is correct.

7. The controller according to claim 5, wherein the operation c) includes:
when there is a correct frame and an error frame in a second clock cycle after the first clock cycle, if a value corresponding to the frame correction position indication signal is greater than a value corresponding to the frame error position indication signal, then sending a request to enter into the state of allowing NAC frame transmission and ignoring the request for NAC frame transmission.

8. The controller according to claim 5, wherein the interconnection protocol is Universal Flash Storage (UFS) standard.

* * * * *